No. 814,034. PATENTED MAR. 6, 1906.
G. H. FRY.
BICYCLE LOCK.
APPLICATION FILED NOV. 30, 1904.
2 SHEETS—SHEET 1.
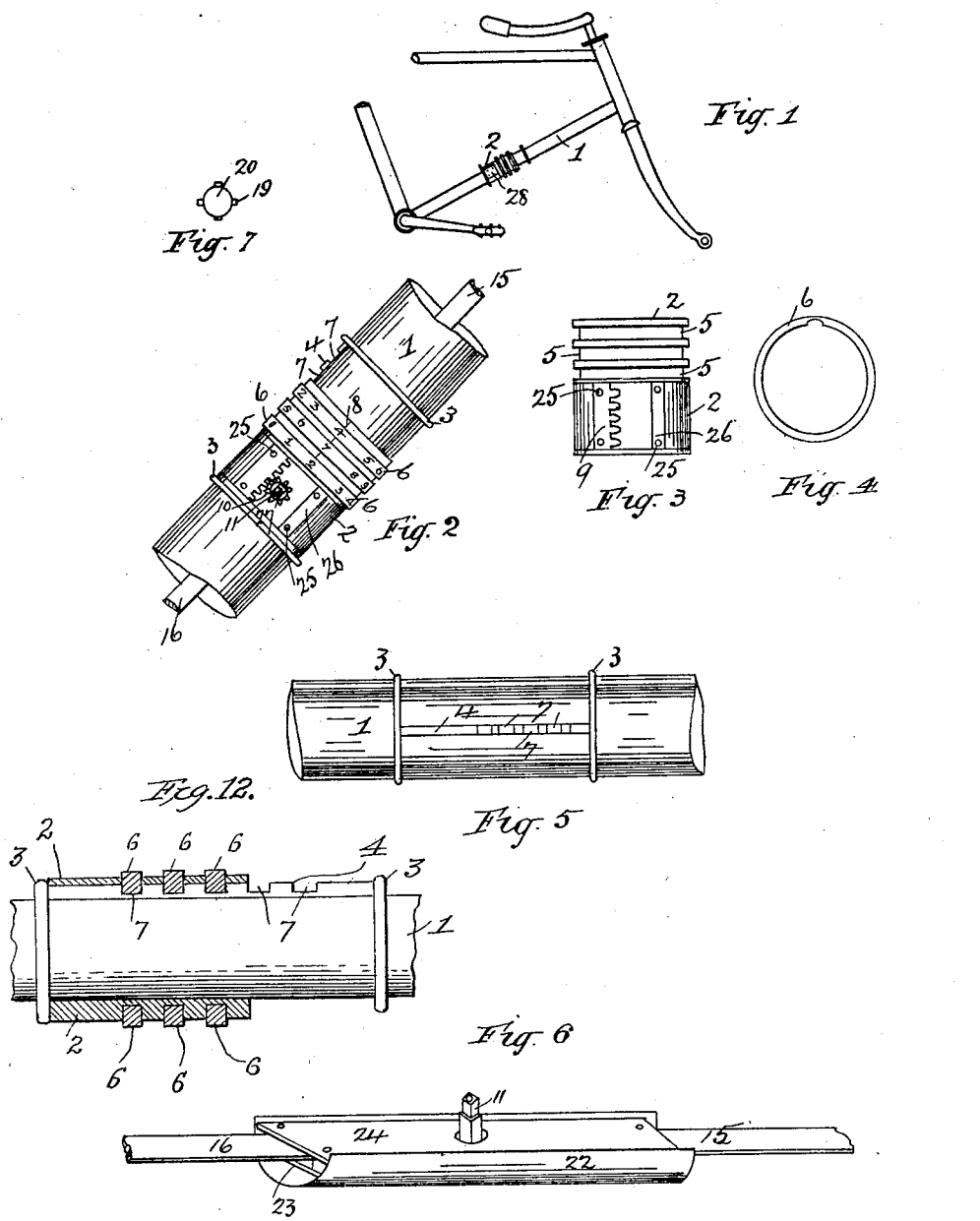
Witnesses
Inventor
George Hamilton Fry
by Geo. P. Whittlesey
Atty.

No. 814,034. PATENTED MAR. 6, 1906.
G. H. FRY.
BICYCLE LOCK.
APPLICATION FILED NOV. 30, 1904.
2 SHEETS—SHEET 2.
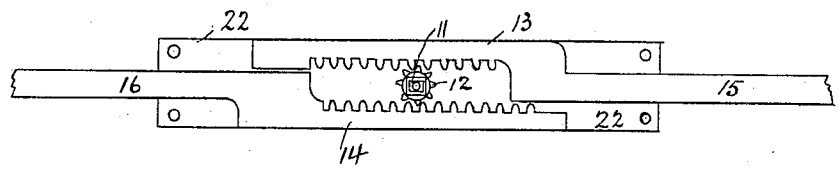
Fig. 8
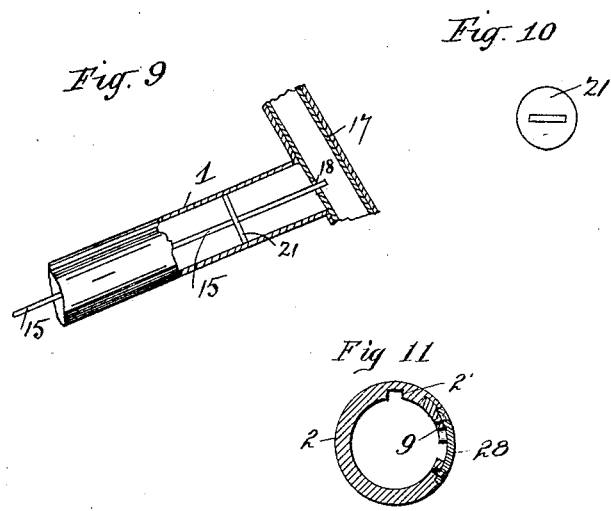
Witnesses
Geo. W. Hamlin
Sarah V. Lockwood
Inventor:
George Hamilton Fry
by Geo. P. Whittlesey
Atty.

UNITED STATES PATENT OFFICE.

GEORGE HAMILTON FRY, OF ASHBURTON, NEW ZEALAND.

BICYCLE-LOCK.

No. 814,034.     Specification of Letters Patent.     Patented March 6, 1906.

Application filed November 30, 1904. Serial No. 234,890.

*To all whom it may concern:*

Be it known that I, GEORGE HAMILTON FRY, a subject of the King of Great Britain, residing at Ashburton, in the Colony of New Zealand, have invented a new and useful Means for Locking Bicycles; and I do hereby declare the following to be a full, clear, and exact description of the same.

This invention refers to means for locking a bicycle so that the machine cannot be ridden away by a thief during the absence of the owner.

The device I employ for my purpose is used in connection with a numeral combination and is fully explained in the following specification and illustrated in the accompanying drawings, in which—

Figure 1 shows part of the frame of a bicycle with my invention fitted on the down-tube. Fig. 2 is an exterior view of the device. Fig. 3 is a grooved and slotted sleeve-piece, and Fig. 4 is a slotted ring. Fig. 5 shows that part of the down-tube upon which the device is adapted to slide and notched feather. Fig. 6 is a perspective view of part of the interior of the lock. Fig. 7 is an end elevation of the crank-axle of a bicycle used with my invention. Fig. 8 is a plan of the interior operating mechanism. Fig. 9 is a section of part of the steering-head of a bicycle, showing the lock-bolt entering slot in head. Fig. 10 is a slotted guide-disk in which the lock-bolts are supported, and Fig. 11 a cross-section through the slidable sleeve. Fig. 12 is a sectional elevation, on an enlarged scale, showing the tube, sleeve, notched feather, and locking-rings.

My improved lock is built into the down-tube 1 of a bicycle. Slidable upon the tube 1 is a sleeve-piece 2, the motion of which may be confined within the annular stops 3 upon the tube. When the sleeve-piece is slid along the tube, it causes a bolt to be shot up and down the tube, so as to lock with the steering-head and crank-spindle, as hereinafter explained. The sleeve-piece has an internal longitudinal slot 2' to adapt it to be held upon and to move along a feather 4 upon the tube 1. Said feather is notched at intervals, as shown in Figs. 2 and 5.

The sleeve-piece 2 has a plurality of circumferential grooves 5, in which are located rings 6, that fill the grooves. The rings have internal slots, as shown in Fig 4, which fit upon the feather, the grooves 5 being of such depth that the feather projects into them. In order to permit the rings to be turned upon the sleeve, the feather is notched at intervals corresponding with the grooves 5, so that when said grooves register with said notches the rings can be rotated in said grooves. It will be seen that the turning of even one ring so that its internal slot is out of line with the feather will prevent the sleeve from being slid lengthwise along the tube 1. The travel of the sleeve along the tube is of such length that when the sleeve is at either end of its range of movement the grooves will register with the notches in the feather. The object of this arrangement is to insure that the rings or collars can be moved circumferentially about the sleeve; but this is impossible unless the collars are brought immediately over the notches in the feather. The rings are numbered circumferentially, and the numbers are so placed that when a given combination of numerals is arranged in line with the mark 8 upon the sleeve-piece the slots in the rings will come into line with the slot in the sleeve, and thus a continuous slot will be formed in the sleeve-piece and rings which will enable the whole device to be slid along the tube. Thus, say the numeral combination to be "4, 7, 2," these figures will be brought into line opposite the mark 8, as shown in Fig. 2, which will also bring into line the slots in sleeve and rings. When the sleeve has been moved away from its normal position and the bolts shot, the numeral combination can be lost by turning the rings or collars round the sleeve in the notches 7, and it will be impossible without damaging the device to return the sleeve to its original position. When it is desired to unlock the bicycle, the numbers ("4, 7, 2" in the present instance) would be brought into line opposite mark 8 and the sleeve slid backward. The combination is then again lost, and as it is known only to the person in charge of the bicycle no one else can successfully tamper with the lock. Part of the sleeve is removed to allow for the insertion longitudinally of a short-toothed rack 9, in which gears a pinion 10, held upon a suitable pin 11, coming from within the down-tube 1. When the sleeve is moved along the tube, the rack rotates the pinion and its support. Upon the lower end of the pin 11 is a second pinion 12, rigidly attached thereto, which gears simultaneously with toothed racks 13 and 14, which form, respectively, part of extension-pieces 15 and 16, operating as bolts of the lock. The piece 15 is extended far enough along the tube to engage the steering-head 17, wherein is a slot or opening 18, through which the bolt 15 passes when shot. The other bolt-piece 16 passes down the tube to engage projections 19 or their equivalent upon the crank-spindle 20, Fig. 7. In order to keep the bolts in position in the tube and to insure their engaging the steering-head and crank-spindle, as explained, perforated disks 21 are provided in the tube, through which the bolts pass.

The interior operating mechanism is held in a cradle 22, having a radius about equal to that of the tube 1, into which it is inserted. Plates 23 and 24, that are secured in the cradle, serve to hold the mechanism in position.

My invention operates as follows: When the lock is rendered operable by bringing into line the combination of numbers upon the collars 6, of which three are employed herein and shown to illustrate my invention, the sleeve 2 is slid along the tube 1 until it comes against the stop 3. The longitudinal motion of the sleeve is converted into a rotary motion of the vertical pin 11 through the rack 9 and pinion 10. At the same time the pinion 12 will be rotated and the bolts 13 and 14 caused to be shot through the pinion 12, meshing in the bolt-racks. The bicycle will now be locked, and, if the numeral combination is lost, by revolving the collars on the sleeve it will remain locked until some one who is acquainted with the combination rearranges it and slides back the sleeve. When the bolts have been shot, the bicycle cannot be ridden or steered, as the lower bolt will be in engagement with the crank-spindle and the other bolt will have passed through the steering-tube 17.

In order to prevent dust interfering with the exterior rack and pinion, a plate may be placed over it and screwed down in the holes 25. For this purpose the rack 9 and a portion 26 of the sleeve is recessed, so that when a plate 28, Fig. 1, is placed over the parts it will be flush with the sleeve.

The pinion 10 is prevented from coming off the pin 11 by a screw 27, threaded into the head of the pin.

Having now described my invention, what I claim as new, and desire to secure by Letters Patent, is—

1. In a bicycle-lock, the combination with the down-tube of a bicycle, of a feather upon said tube which has notches at intervals, a sleeve slidable on the tube, a combination device composed of rings numbered circumferentially and loose upon the sleeve and engaging the notches in said feather, means permitting a sliding movement of the sleeve when the rings are brought into predetermined relation with the feather, and locking mechanism operated when the sleeve is given a longitudinal movement adapted to engage the steering-head and crank-spindle.

2. In a bicycle-lock, the combination with the down-tube of a bicycle, of a sleeve-piece slidable thereon having annular grooves, rings or collars each numbered circumferentially and loosely located in the annular grooves, a feather upon the tube having notches at intervals corresponding with the collars, said sleeve and collars having an internal longitudinal slot or keyway, said sleeve-piece having an opening and carrying a toothed rack therein, a vertical pin passing into the down-tube, a pinion upon the pin gearing with the rack, a second pinion on the lower end of the pin in the tube, other toothed racks set opposite to each other with which the second pinion engages, bolts upon the racks adapted to be shot in opposite directions as the sleeve is moved and the pinions are rotated, and means for supporting said toothed racks and second pinion.

3. In a bicycle-lock, the combination with the down-tube of a bicycle, of a sleeve-piece slidable thereon and having annular grooves, collars or rings located in the grooves and adapted to revolve therein and provided with circumferentially-arranged numerals, a feather upon the tube having notches corresponding with the collars aforesaid, said sleeve and collars having an internal longitudinal slot adapted to receive the feather, said sleeve-piece having an opening, a lid covering said opening, a toothed rack in the opening and disposed longitudinally of the sleeve, a vertically-disposed pin passing through the tube, a pinion upon the pin which gears with the rack aforesaid, a second pinion on the inner end of the pin, toothed racks set opposite to each other and engaging the second pinion, bolts upon the racks which are adapted to be shot in opposite directions as the sleeve is moved and the pinions rotated, a crank-spindle having projections, a steering-tube having a slot, said bolts adapted to engage the projections on the crank-spindle and the slot in the steering-tube, and means for supporting the racks and bolts.

In testimony whereof I have signed this specification in the presence of two subscribing witnesses.

GEORGE HAMILTON FRY.

Witnesses:
P. M. NEWTON,
M. E. EYES.